March 22, 1927.

A. G. SMITH 1,622,167

COMBINATION ARTICLE

Filed June 26, 1926

INVENTOR
A. G. Smith.
BY Watson, Coit,
Morse & Grindle
ATTYS.

Patented Mar. 22, 1927.

1,622,167

UNITED STATES PATENT OFFICE.

ALLAN GORDON SMITH, OF LONDON, ENGLAND.

COMBINATION ARTICLE.

Application filed June 26, 1926. Serial No. 118,814.

This invention is for an improved combination article intended for ladies' use, and known as a ladies' companion.

According to this invention the improved ladies' companion comprises a base-plate in the form of a bracket (for example for mounting in the interior of a motor car), a body-portion of mouldable material in the form of a pocket secured on the base-plate, and a flanged box detachably mounted in slides on the front of the body-portion.

The body-portion provides a receptacle to contain such articles as a mirror, comb, card-case or the like, and the detachably-mounted box is used as a container for powder, cream or other similar articles.

According to another feature of this invention the flanged box is so constructed that its lid is concealed, being situated on that side of the box adjacent the body-portion when the box is in its normal position. The bottom of the box which is exposed may be provided with an ornamental design.

According to yet another feature of this invention, the detachable box is cylindrical or conical in form and its side walls are fluted to facilitate the handling of the box.

In the accompanying drawings, which illustrate one embodiment of the present invention—

Like reference characters indicate like parts throughout the drawings.

Figure 1:
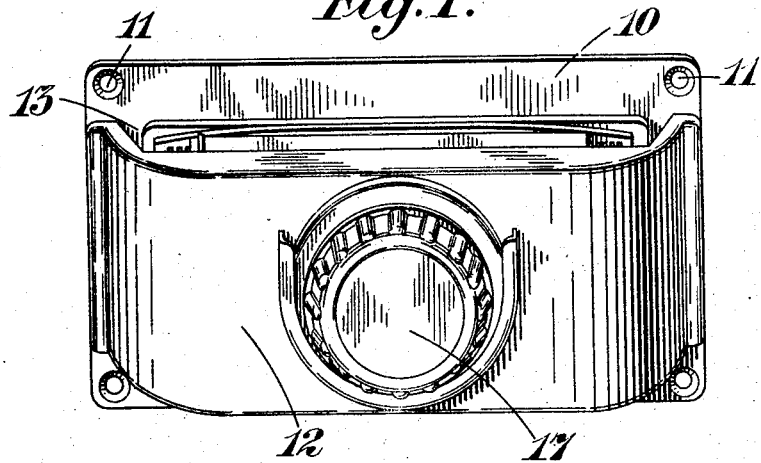
Figure 1 is a front perspective view of the complete article.
Figure 2:
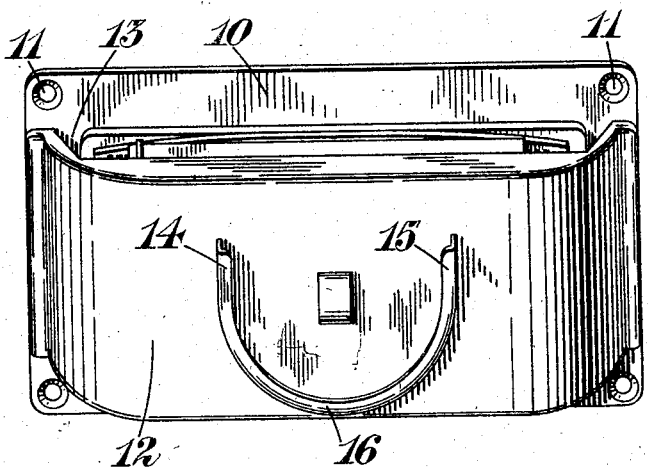
Figure 2 is a similar view with the removable box removed.

Referring to these drawings, the improved ladies' companion comprises a metal base-plate 10 provided with holes 11 to receive screws to mount it in the interior of a motor car, as a fitting therein. Upon this base-plate there is secured a body-portion 12 which is made of a mouldable material and constitutes when secured on the base-plate 10 a pocket or receptacle 13. Various mouldable materials are now available for such purposes, such for example, as electrical insulating materials, casein products and so forth, and these are particularly suitable for the purpose of the present invention in that they provide an article which, whilst of handsome appearance and capable of being produced in various colours or combinations of colours, is at the same time inexpensive.

On the front of the body-portion 12 there is secured a metal slide; conveniently it is of U-shaped formation with the parallel limbs 14, 15 directed upwardly and a semi-circular bottom portion 16 being made of angle-section so as to provide a parallel-grooved slide. The purpose of this slide is to accommodate a detachably mounted box 17 which is preferably made of truncated conical form, and is provided with a flange 18 at its larger end, the flange being of such dimensions that it can enter the grooved slides 14, 15 aforesaid so as to retain the box therein. The semi-circular lower end 16 of the guide is also shaped to conform with the box so as to constitute a rest or support therefor.

Figure 3:
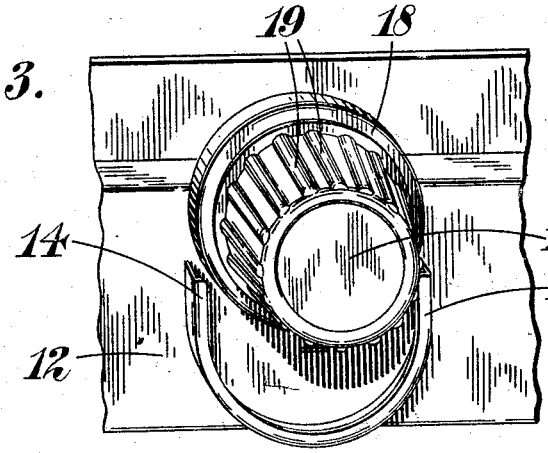
Figure 3 is a perspective view showing the removable box displaced from its slides.

The box 17 is preferably made of mouldable material, similarly to the body-portion 12 of the device, and its curved wall is preferably fluted as shown at 19 (Figure 3) so as to facilitate its handling. The flange 18 on the box may be constituted by a metal rim and the lid of the box is arranged to be on that side of it which is against the body-portion 12 when the box is in its normal position. This box may further be provided with internal partitions, or separate containers may be provided in it so that various materials such as powder and cream can be carried in it.

The ladies' companion provided by this invention resembles as to its general shape the smokers' companion described in British patent application No. 11679/25, and the two together form a pair of fittings for motor vehicles which are of great utility and elegant appearance.

I claim:—

1. A combination toilet article comprising in combination a base-plate, means for mounting it in the interior of a motor car, a body-portion of mouldable material secured thereon to constitute a pocket, a member comprising a grooved support and grooved slides mounted on the front of said body-portion, and a flanged box removably mounted in said slides.

2. A combination toilet article comprising in combination a base-plate, means for mounting it in the interior of a motor car, a body-portion of mouldable material secured thereon to constitute a pocket, a flanged metal strip secured on the front of said body-portion to constitute vertical grooved slides and a curved grooved support connecting the lower ends of the slides, and a flanged box removably mounted in said slides and support.

3. A combination toilet article comprising in combination a base-plate, means for mounting it in the interior of a motor car, a body portion of mouldable material secured thereon to constitute a pocket, a box of circular form having a lid at one end and a circumferential flange near that end, and a support having vertical slides mounted on the front of the said body-portion to receive said flange and retain the box in position.

In testimony whereof I affix my signature.

ALLAN GORDON SMITH.